United States Patent
Douglas et al.

(10) Patent No.: US 10,919,577 B2
(45) Date of Patent: Feb. 16, 2021

(54) ROCKER ASSEMBLY FOR AN AUTOMOTIVE VEHICLE

(71) Applicant: GM GLOBAL TECHNOLOGY OPERATIONS LLC, Detroit, MI (US)

(72) Inventors: Richard W. Douglas, Warren, MI (US); Robert Ristoski, Shelby Township, MI (US); Robert N. Saje, Shelby Township, MI (US); Kevin Stang, Farmington Hills, MI (US); Terry A. Swartzell, Ann Arbor, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 111 days.

(21) Appl. No.: 16/385,405

(22) Filed: Apr. 16, 2019

(65) Prior Publication Data
US 2020/0331539 A1    Oct. 22, 2020

(51) Int. Cl.
*B62D 25/02*    (2006.01)
*B62D 25/20*    (2006.01)

(52) U.S. Cl.
CPC ........ *B62D 25/025* (2013.01); *B62D 25/2036* (2013.01)

(58) Field of Classification Search
CPC .......................... B62D 25/025; B62D 25/2036
USPC ....................................................... 296/209
See application file for complete search history.

(56) References Cited

U.S. PATENT DOCUMENTS

| | | | |
|---|---|---|---|
| 7,520,563 B1* | 4/2009 | An ................ | B62D 21/02 296/193.05 |
| 10,370,040 B1* | 8/2019 | Cooper ............. | B62D 21/157 |
| 2006/0097533 A1* | 5/2006 | Watanabe .......... | B62D 25/025 296/30 |
| 2007/0029842 A1* | 2/2007 | Gade ................ | B62D 25/2081 296/209 |
| 2013/0049408 A1* | 2/2013 | Kurogi .............. | B62D 25/025 296/209 |
| 2016/0039475 A1* | 2/2016 | Hofer ................ | F16B 11/006 296/29 |
| 2016/0325785 A1* | 11/2016 | Nakagawa ......... | B62D 25/025 |
| 2017/0050679 A1* | 2/2017 | Shirooka ........... | B62D 27/023 |
| 2019/0217898 A1* | 7/2019 | Tchepikov ......... | B62D 29/007 |

(Continued)

FOREIGN PATENT DOCUMENTS

| | | | | |
|---|---|---|---|---|
| DE | 102014018324 A1 * | 6/2015 | ......... | B62D 25/025 |
| WO | WO-2015055908 A2 * | 4/2015 | ......... | B62D 25/025 |

*Primary Examiner* — Jason S Morrow

(57) ABSTRACT

An automotive vehicle includes a vehicle body with a longitudinal axis. The vehicle also includes a rocker inner panel with a first channel having interior and exterior sides. The interior side is secured to the vehicle body. The first channel has a first upper horizontal sidewall, a first lower horizontal sidewall, and a first vertical endwall coupling the first upper and first lower horizontal sidewalls at the interior side. A rocker outer panel is secured to the rocker inner panel. The rocker outer panel includes a second channel, a third channel, and a fourth channel. The second channel is secured to the third channel, and the third channel is secured to the fourth channel. An upper cavity is defined between the second and third channels, an intermediate cavity is defined between the third and fourth channels, and a lower cavity is defined between the second and third channels.

19 Claims, 4 Drawing Sheets

(56) References Cited

U.S. PATENT DOCUMENTS

| | | | |
|---|---|---|---|
| 2019/0248423 A1* | 8/2019 | Kato | B62D 25/025 |
| 2020/0114973 A1* | 4/2020 | Takahashi | B62D 25/025 |
| 2020/0262491 A1* | 8/2020 | Shannon | B62D 25/025 |
| 2020/0282816 A1* | 9/2020 | Matsuda | B62D 25/20 |

* cited by examiner

ROCKER ASSEMBLY FOR AN AUTOMOTIVE VEHICLE

INTRODUCTION

The present invention relates to an automotive vehicle body and more particularly to a rocker panel structure for an automotive vehicle body.

Automotive vehicle bodies conventionally have a rocker panel structure that extends lengthwise along the vehicle body to define the bottom of the front and rear door openings. Rocker panels typically include a rocker inner panel that is welded to the A-pillar, B-pillar and C-pillar of the vehicle body. A rocker outer panel is welded to the rocker inner panel forming a box-shaped structure. The rocker structure must satisfy a variety of design considerations, including adequate strength and stiffness to carry the necessary loads during use of the vehicle.

SUMMARY

An automotive vehicle according to the present disclosure includes a vehicle body with a fore portion, an aft portion, and a longitudinal axis extending from the fore portion to the aft portion. The vehicle also includes a rocker inner panel. The rocker inner panel includes a first channel with an interior side and an exterior side. The interior side is secured to the vehicle body. The first channel has a first upper horizontal sidewall, a first lower horizontal sidewall, and a first vertical endwall coupling the first upper horizontal sidewall to the first lower horizontal sidewall at the interior side. The vehicle additionally includes a rocker outer panel secured to the rocker inner panel. The rocker outer panel includes a second channel, a third channel, and a fourth channel. The second channel is secured to the third channel, and the third channel is secured to the fourth channel. An upper cavity is defined between the second channel and the third channel, an intermediate cavity is defined between the third channel and the fourth channel, and a lower cavity is defined between the second channel and the third channel.

In an exemplary embodiment, the first channel includes a first lower flange and the fourth channel includes a fourth lower flange. The first lower flange is secured to the fourth lower flange. The second channel may include a second vertical endwall and the third channel may include a third vertical endwall, and at least one weld aperture may extend through the second vertical endwall and third vertical endwall. The third channel may include a third upper flange and the fourth channel may include a fourth vertical endwall, with the fourth vertical endwall being secured to the third upper flange. The first channel may include a first upper flange and the second channel may include a second upper flange, with the first upper flange being secured to the second upper flange. The fourth channel may include a fourth upper flange, with the fourth upper flange being secured to the second upper flange. The second channel may include a second lower flange and the third channel may includes a third lower flange, with the third lower flange being secured to the second lower flange and to the fourth lower flange.

A method of assembly according to the present disclosure includes forming a first elongate channel member, a second elongate channel member, a third elongate channel member, and a fourth elongate channel member. The first channel includes a first upper horizontal sidewall, a first lower horizontal sidewall, and a first vertical endwall coupling the first upper horizontal sidewall to the first lower horizontal sidewall. The method additionally includes securing the fourth channel member to the third channel member with an intermediate cavity being defined therebetween. The method also includes securing the second channel member to the third and fourth channel members, with an upper cavity and a lower cavity being defined between the second channel member and the third channel member. The method further includes securing the first channel member to the second, third, and fourth channel members.

In an exemplary embodiment, the securing steps include welding.

In an exemplary embodiment, the forming step includes roll-forming, extrusion, or casting.

In an exemplary embodiment, the method additionally includes tuning relative sizes of the upper cavity, intermediate cavity, and lower cavity based on structural requirements.

In an exemplary embodiment, the method additionally includes providing the first channel member with at least one corner reinforcement between the first vertical endwall and the first upper horizontal sidewall or between the first vertical endwall and the first lower horizontal sidewall.

In an exemplary embodiment, the method additionally includes providing the first channel member with at least one bulkhead retained between the first upper horizontal sidewall and the first lower horizontal sidewall.

In an exemplary embodiment, the first channel member includes a first lower flange and the fourth channel member includes a fourth lower flange, and securing the first channel member to the second, third, and fourth channel members includes securing the first lower flange to the fourth lower flange.

In an exemplary embodiment, the third channel member includes a third upper flange and the fourth channel member includes a fourth vertical endwall, and securing the third channel member to the fourth channel member includes securing the fourth vertical endwall to the third upper flange.

In an exemplary embodiment, the first channel member includes a first upper flange and the second channel member includes a second upper flange, and securing the first channel member to the second, third, and fourth channel members includes securing the first upper flange to the second upper flange.

In an exemplary embodiment, the fourth channel member includes a fourth upper flange, and securing the second channel member to the third and fourth channel members includes securing the fourth upper flange to the second upper flange.

In an exemplary embodiment, the second channel member includes a second lower flange and the third channel member includes a third lower flange, and securing the second channel member to the third and fourth channel members includes securing the third lower flange to the second lower flange and to the fourth lower flange.

An assembly according to the present disclosure includes a rocker inner panel and a rocker outer panel. The rocker inner panel includes a first channel with an interior side and an exterior side. The first channel has a first upper horizontal sidewall, a first lower horizontal sidewall, a first lower flange extending from the first lower horizontal sidewall, and a first vertical endwall coupling the first upper horizontal sidewall to the first lower horizontal sidewall at the interior side. The rocker outer panel includes a second channel, a third channel, and a fourth channel. The second channel includes a second upper horizontal sidewall, a second lower horizontal sidewall, a second lower flange extending from the second lower horizontal sidewall, and a second vertical endwall coupling the second horizontal sidewall to the second lower horizontal sidewall. The third channel includes a third upper horizontal sidewall, a third lower horizontal sidewall, a third lower flange extending from the third lower horizontal sidewall, and a third vertical endwall coupling the third horizontal sidewall to the third lower horizontal sidewall. The fourth channel includes a fourth upper horizontal sidewall, a fourth lower horizontal sidewall, a fourth lower flange extending from the fourth lower horizontal sidewall, and a fourth vertical endwall coupling the fourth horizontal sidewall to the fourth lower horizontal sidewall. The first lower flange is secured to the fourth lower flange, the fourth vertical endwall is secured to the third upper flange, the first upper flange is secured to the second upper flange, the fourth upper flange is secured to the second upper flange, and the third lower flange is secured to the second lower flange and to the fourth lower flange such that an upper cavity is defined between the second channel and the third channel, an intermediate cavity is defined between the third channel and the fourth channel, and a lower cavity is defined between the second channel and the third channel.

Embodiments according to the present disclosure provide a number of advantages. For example, a rocker assembly according to the present disclosure may be manufactured using simple forming steps, while providing consistent and tunable performance according to the needs of a given application.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Figure 1:
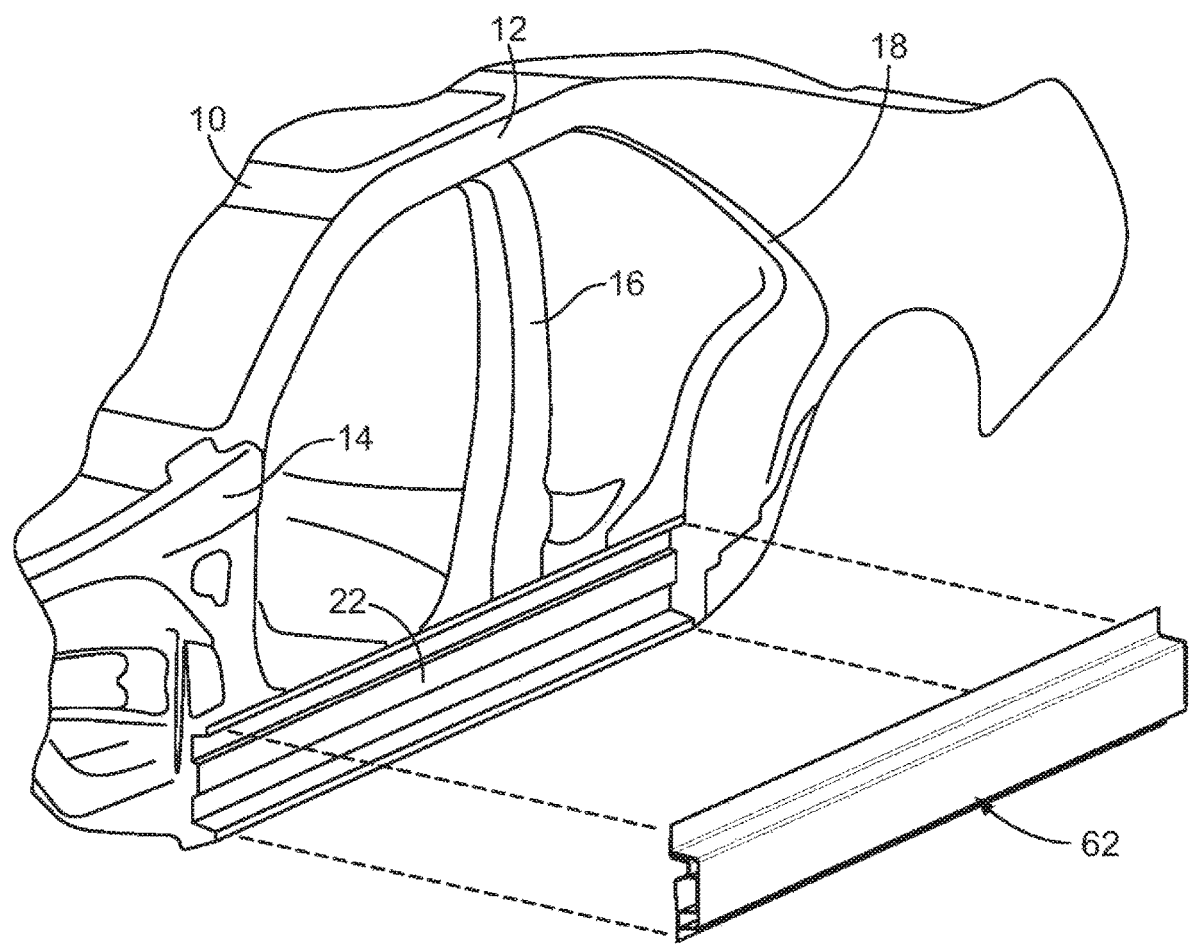
FIG. 1 is an illustrative view of an automotive vehicle according to an embodiment of the present disclosure.

Referring now to FIG. 1, an automotive vehicle according to an embodiment of the present disclosure is illustrated. A vehicle body, generally indicated at 10, is an assemblage of a number of stamped metal panels that are welded together or otherwise secured to one another. The vehicle body 10 includes a roof rail 12, an A-pillar structure 14, a B-pillar structure 16, a C-pillar structure 18, and a rocker inner panel 22 that extends generally horizontally over the length of the vehicle body between the A-pillar, B-pillar, and C-pillar.

Figure 2:
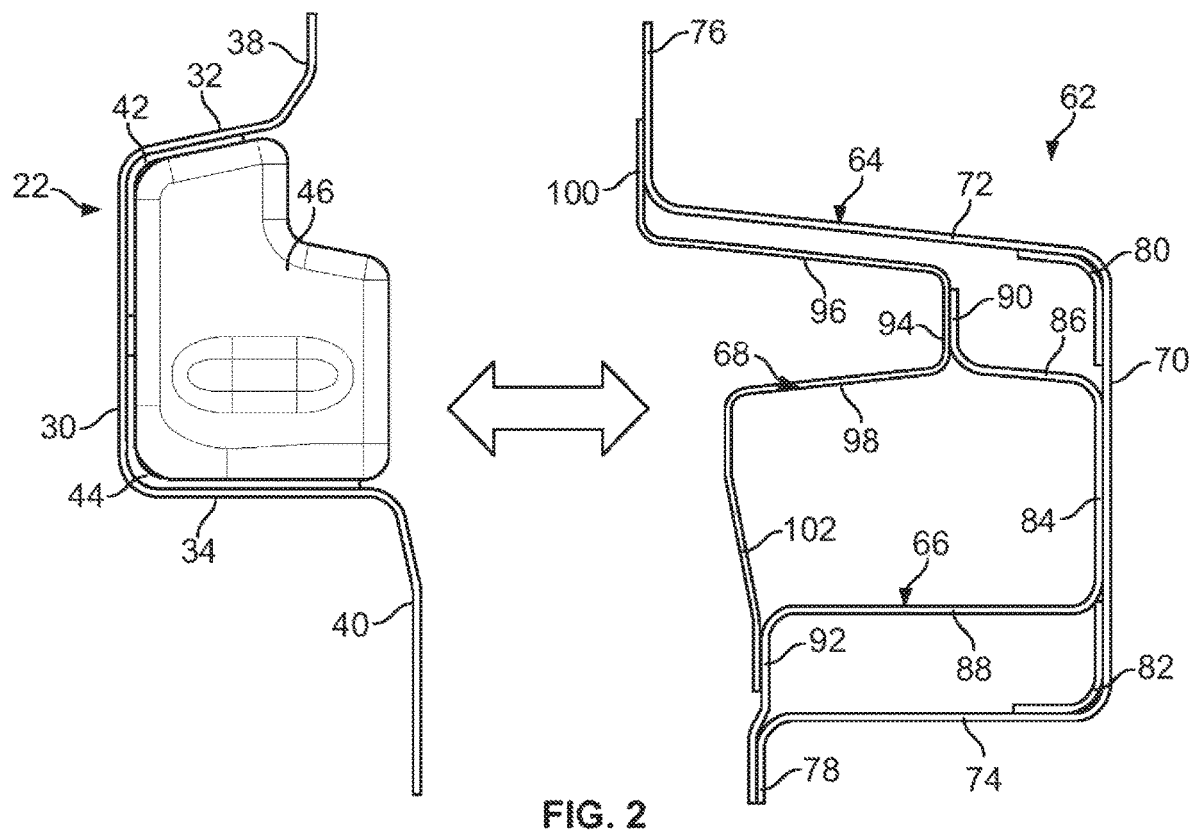
FIG. 2 is a cross-sectional view of a rocker assembly according to an embodiment of the present disclosure.

As best seen in FIG. 2, the rocker inner panel 22 is a first generally C-shaped channel that opens outwardly toward the exterior of the vehicle body. The rocker inner panel 22 may formed by stamping, roll-forming, extrusion, or other suitable methods. The first channel includes a first vertical endwall 30, a first upper horizontal sidewall 32, and a first lower horizontal sidewall 34. A first upper flange 38 extends upwardly from the first upper horizontal sidewall 32, and a first lower flange 40 extends downwardly from the first lower horizontal sidewall 34. As best seen in FIG. 2, a first corner reinforcement 42 is secured to the rocker inner panel 22 at an interface between the first vertical endwall 30 and the first upper horizontal sidewall 32, and a second corner reinforcement 44 is secured to the rocker inner panel 22 at an interface between the first vertical endwall 30 and the first lower horizontal sidewall 34. As used herein, securing refers to the use of welding, fasteners, adhesives, or other suitable methods for reliably coupling components to one another. In addition, one or more bulkheads 46 may be disposed within the rocker inner panel 22, e.g. secured to the first corner reinforcement 42 and the second corner reinforcement 44. The bulkheads 46 add strength and rigidity to the rocker inner panel 22.

FIGS. 1 and 2 also show a rocker outer panel, generally indicated at 62. The rocker outer panel 62 includes multiple stamped, roll-formed, extruded, or otherwise formed panels that extend longitudinally of the vehicle body 10 and are adapted to overlie and be attached to the rocker inner panel 22 of the vehicle body 10. As best seen in FIG. 2, the rocker outer panel 62 includes a second generally C-shaped channel 64, a third generally C-shaped channel 66, and a fourth generally C-shaped channel 68.

The second channel 64 opens inwardly and includes a second vertical endwall 70, a second upper horizontal sidewall 72, and a second lower horizontal sidewall 74. A second upper flange 76 extends upwardly from the second upper horizontal sidewall 72, and a second lower flange 78 extends downwardly from the second lower horizontal sidewall 74. A third corner reinforcement 80 is secured to the second channel 64 at an interface between the second vertical endwall 70 and the second upper horizontal sidewall 72, and a fourth corner reinforcement 82 is secured to the second channel 64 at an interface between the second vertical endwall 70 and the second lower horizontal sidewall 74.

The third channel 66 opens inwardly and includes a third vertical endwall 84, a third upper horizontal sidewall 86, and a third lower horizontal sidewall 88. A third upper flange 90 extends upwardly from the third upper horizontal sidewall 86, and a third lower flange 92 extends downwardly from the third lower horizontal sidewall 88. The third lower flange 92 is secured to the second lower flange 78 of the second channel 64. The third vertical endwall 84 is secured to the second vertical endwall 70 of the second channel 64.

The fourth channel 68 opens inwardly and includes a fourth vertical endwall 94, a fourth upper horizontal sidewall 96, and a fourth lower horizontal sidewall 98. A fourth upper flange 100 extends upwardly from the fourth upper horizontal sidewall 96, and a fourth lower flange 102 extends downwardly from the fourth lower horizontal sidewall 98. The fourth upper flange 100 is secured to the second upper flange 76 of the second channel 64. The fourth lower flange 102 is secured to the third lower flange 92 of the third channel 66. The fourth vertical endwall 94 is secured to the third upper flange 90 of the third channel 66.

As may be seen, in this configuration the rocker outer panel 62 comprises a plurality of distinct chambers, e.g. between the first channel 64 and the second channel 66, and between the second channel 66 and the third channel 68. Such chambers contribute to increased bending stiffness along the length of the rocker outer panel 62.

Figure 3:
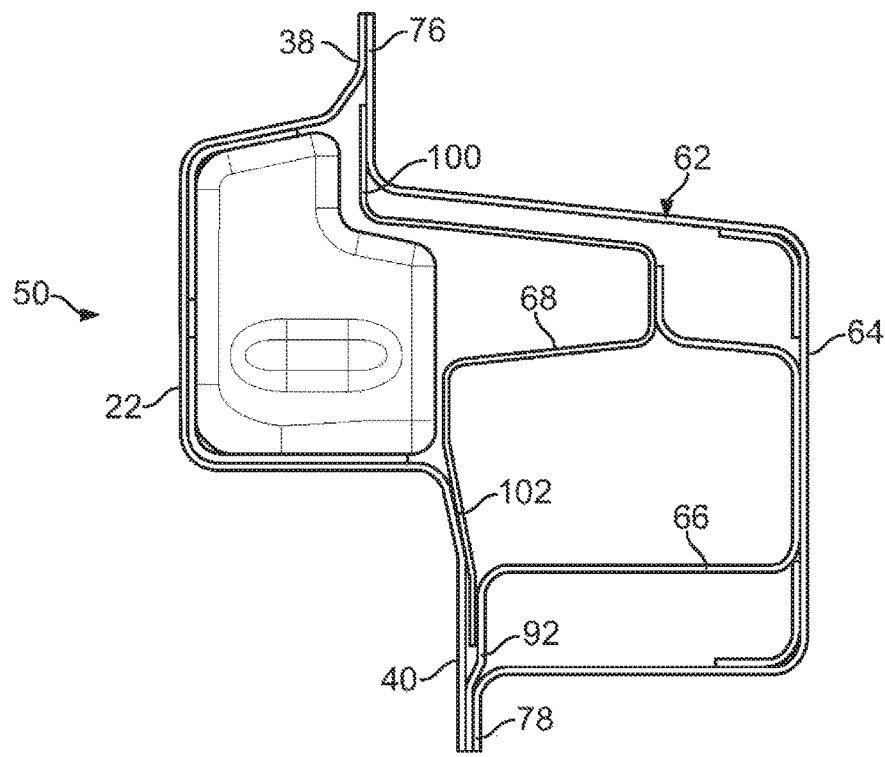
FIG. 3 is a second cross-sectional view of a rocker assembly according to an embodiment of the present disclosure.
Figure 4:
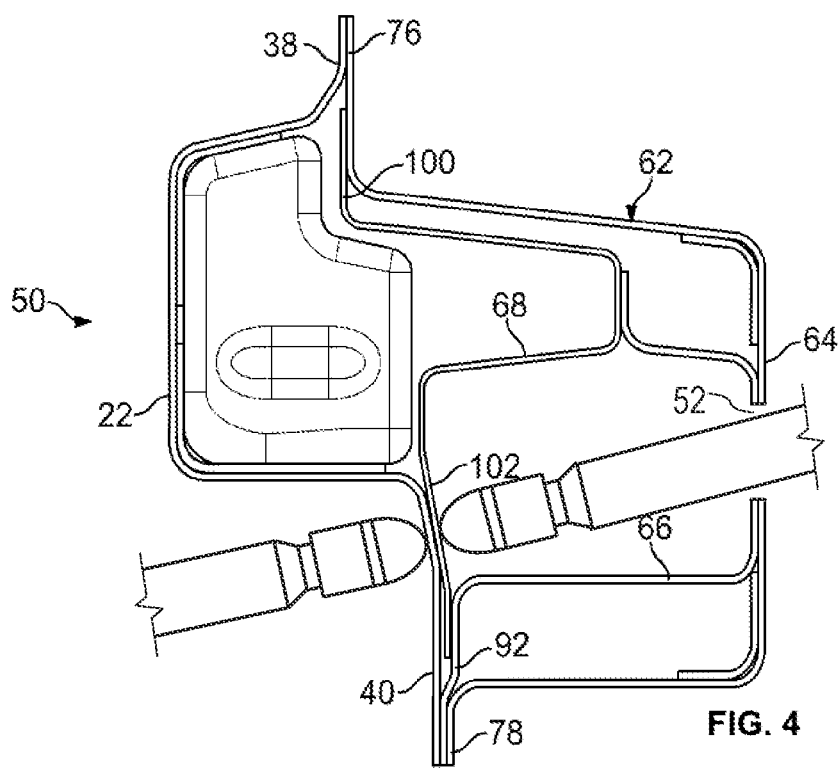
FIG. 4 is an isometric view of a rocker assembly according to an embodiment of the present disclosure.

As best illustrated in FIG. 3, the rocker outer panel 62 is attached to the rocker inner panel 22 to define a combined rocker assembly 50. The rocker outer panel 62 may be attached to the rocker inner panel 22 by securing together the respective upper flanges 38 and 76 (and/or 100), and also securing together the respective lower flanges 40 and 102 (and/or 78, 92). As illustrated in FIG. 4, a plurality of apertures 52 may be provided through the second channel 64 and third channel 66, to thereby permit weld access to the interface between the lower flanges 102, 40.

Advantageously, the relative sizes of the various flanges may be tuned according to the structural requirements of a given vehicle embodiment, e.g. to balance load capacity. A common design strategy may thereby be employed across a variety of vehicles or vehicle types. Moreover, by utilizing a plurality of continuous longitudinal members, continuous performance may be obtained across the length of the rocker section.

Figure 5:
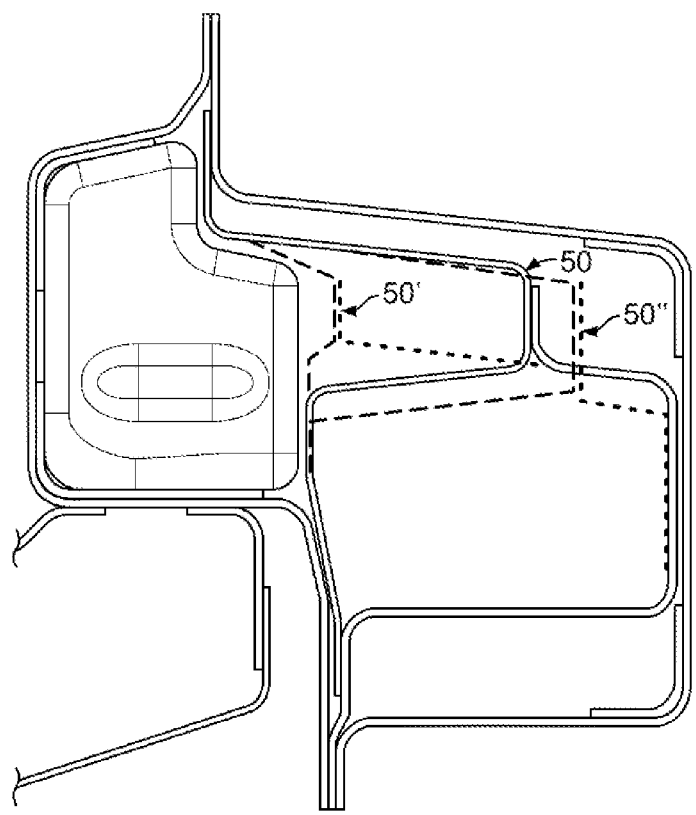
FIG. 5 is a cross-sectional view illustrating alternate configurations of rocker assemblies according to embodiments of the present disclosure.

Referring now to FIG. 5, illustrative alternate configurations are shown in phantom. As an example, in a first alternate configuration 50', the length of the third upper horizontal sidewall 86 of the third channel 66 is increased relative to the length of the fourth lower horizontal sidewall 98 of the fourth channel 68, increasing an engagement area between the fourth channel 68 and the bulkhead 46, thereby providing a higher loadpath for energy transfer between the fourth channel 68 and the bulkhead 46. As an additional example, in the second alternate configuration 50", the length of the third upper horizontal sidewall 86 of the third channel 66 is decreased relative to the length of the fourth lower horizontal sidewall 98 of the fourth channel 68, decreasing an engagement area between the fourth channel 68 and the bulkhead 46, thereby providing a lower loadpath for energy transfer between the fourth channel 68 and the bulkhead 46.

Figure 6:
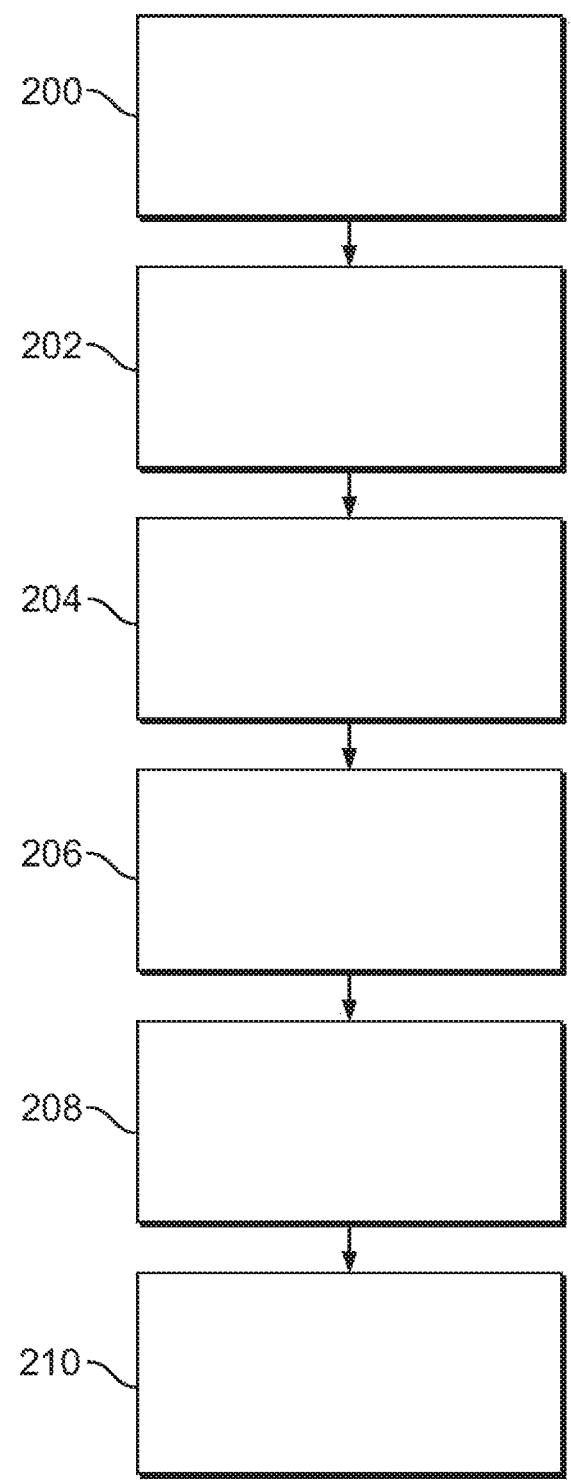
FIG. 6 is a flowchart representation of a method of assembly according to an embodiment of the present disclosure.

Referring now to FIG. 6, a method of assembling a rocker assembly according to the present disclosure is illustrated in flowchart form.

In a tuning step, relative sizes of chambers and flanges are selected based on structural requirements, as illustrated at block 200. This tuning step may be performed via a computer-aided engineering method, by physical testing, or any other suitable method.

First, second, third, and fourth elongate channel members are formed, as illustrated at block 202. The channel members may be formed by roll-forming, extrusion, casting, or any other suitable method. The channel members may be, but are not necessarily, arranged generally similarly to the channel members illustrated in FIGS. 1 through 5.

The first channel member is provided with first and second corner reinforcements and with at least one bulkhead, as illustrated at block 204, to form the rocker inner panel.

The fourth channel member is secured to the third channel member, as illustrated at block 206. In an exemplary embodiment this is performed via welding; however, other methods of securing may be used likewise.

The second channel member is secured to the third and fourth channel members, as illustrated at block 208, to form the rocker outer panel. In an exemplary embodiment this is performed via welding; however, other methods of securing may be used likewise.

The rocker outer panel is secured to the inner panel, as illustrated at block 210. In an exemplary embodiment this is performed via welding; however, other methods of securing may be used likewise.

As may be seen, the present disclosure provides a rocker assembly which may be manufactured using simple forming steps, while providing consistent and tunable performance according to the needs of a given application.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a vehicle body having a fore portion, and an aft portion, and a longitudinal axis extending from the fore portion to the aft portion;
a rocker inner panel comprising a first channel with an interior side and an exterior side, the interior side being secured to the vehicle body, the first channel comprising a first upper horizontal sidewall, a first lower horizontal sidewall, and a first vertical endwall coupling the first upper horizontal sidewall to the first lower horizontal sidewall at the interior side; and
a rocker outer panel secured to the rocker inner panel, the rocker outer panel comprising a second channel, a third channel, and a fourth channel, the second channel being secured to the third channel, the third channel being secured to the fourth channel, an upper cavity being defined between the second channel and the third channel, an intermediate cavity being defined between the third channel and the fourth channel, and a lower cavity being defined between the second channel and the third channel, wherein the first channel includes a first lower flange and the fourth channel includes a fourth lower flange, the first lower flange being secured to the fourth lower flange.

2. The automotive vehicle claim 1, wherein the second channel includes a second vertical endwall and the third channel includes a third vertical endwall, and wherein at least one weld aperture extends through the second vertical endwall and third vertical endwall.

3. The automotive vehicle of claim 1, wherein the third channel includes a third upper flange and the fourth channel includes a fourth vertical endwall, the fourth vertical endwall being secured to the third upper flange.

4. The automotive vehicle of claim 3, wherein the first channel includes a first upper flange and the second channel includes a second upper flange, the first upper flange being secured to the second upper flange.

5. The automotive vehicle of claim 4, wherein the fourth channel includes a fourth upper flange, the fourth upper flange being secured to the second upper flange.

6. The automotive vehicle of claim 5, wherein the second channel includes a second lower flange and the third channel includes a third lower flange, the third lower flange being secured to the second lower flange and to the fourth lower flange.

7. The automotive vehicle of claim 1, further comprising at least one bulkhead secured within the first channel.

8. A method of assembly comprising:
  forming a first elongate channel member, a second elongate channel member, a third elongate channel member, and a fourth elongate channel member, the first channel comprising a first upper horizontal sidewall, a first lower horizontal sidewall, and a first vertical endwall coupling the first upper horizontal sidewall to the first lower horizontal sidewall;
  securing the fourth channel member to the third channel member, an intermediate cavity being defined therebetween;
  securing the second channel member to the third and fourth channel members, an upper cavity and a lower cavity being defined between the second channel member and the third channel member; and
  securing the first channel member to the second, third, and fourth channel members.

9. The method of claim 8, wherein the securing comprises welding.

10. The method of claim 8, wherein forming comprises roll-forming, extrusion, or casting.

11. The method of claim 8, further comprising tuning relative sizes of the upper cavity, intermediate cavity, and lower cavity based on structural requirements.

12. The method of claim 8, further comprising providing the first channel member with at least one corner reinforcement between the first vertical endwall and the first upper horizontal sidewall or between the first vertical endwall and the first lower horizontal sidewall.

13. The method of claim 8, further comprising providing the first channel member with at least one bulkhead retained between the first upper horizontal sidewall and the first lower horizontal sidewall.

14. The method of claim 8, wherein the first channel member includes a first lower flange and the fourth channel member includes a fourth lower flange, and wherein securing the first channel member to the second, third, and fourth channel members comprises securing the first lower flange to the fourth lower flange.

15. The method of claim 14, wherein the third channel member includes a third upper flange and the fourth channel member includes a fourth vertical endwall, and wherein securing the third channel member to the fourth channel member comprises securing the fourth vertical endwall to the third upper flange.

16. The method of claim 15, wherein the first channel member includes a first upper flange and the second channel member includes a second upper flange, and wherein securing the first channel member to the second, third, and fourth channel members comprises securing the first upper flange to the second upper flange.

17. The method of claim 16, wherein the fourth channel member includes a fourth upper flange, and wherein securing the second channel member to the third and fourth channel members comprises securing the fourth upper flange to the second upper flange.

18. The method of claim 17, wherein the second channel member includes a second lower flange and the third channel member includes a third lower flange, and wherein securing the second channel member to the third and fourth channel members comprises securing the third lower flange to the second lower flange and to the fourth lower flange.

19. An assembly comprising:
  a rocker inner panel comprising a first channel with an interior side and an exterior side, the first channel comprising a first upper horizontal sidewall, a first lower horizontal sidewall, a first lower flange extending from the first lower horizontal sidewall, and a first vertical endwall coupling the first upper horizontal sidewall to the first lower horizontal sidewall at the interior side; and
  a rocker outer panel secured to the rocker inner panel, the rocker outer panel comprising a second channel, a third channel, and a fourth channel, wherein the second channel includes a second upper horizontal sidewall, a second lower horizontal sidewall, a second lower flange extending from the second lower horizontal sidewall, and a second vertical endwall coupling the second horizontal sidewall to the second lower horizontal sidewall, wherein the third channel includes a third upper horizontal sidewall, a third lower horizontal sidewall, a third lower flange extending from the third lower horizontal sidewall, and a third vertical endwall coupling the third horizontal sidewall to the third lower horizontal sidewall, and wherein the fourth channel includes a fourth upper horizontal sidewall, a fourth lower horizontal sidewall, a fourth lower flange extending from the fourth lower horizontal sidewall, and a fourth vertical endwall coupling the fourth horizontal sidewall to the fourth lower horizontal sidewall,
  wherein the first lower flange is secured to the fourth lower flange, the fourth vertical endwall is secured to the third upper flange, the first upper flange is secured to the second upper flange, the fourth upper flange is secured to the second upper flange, and the third lower flange is secured to the second lower flange and to the fourth lower flange such that an upper cavity is defined between the second channel and the third channel, an intermediate cavity is defined between the third channel and the fourth channel, and a lower cavity is defined between the second channel and the third channel.

* * * * *